UNITED STATES PATENT OFFICE

HERMAN FRASCH, OF PHILADELPHIA, PA., ASSIGNOR TO HIMSELF, HENRY THOMAS, AND CHARLES B. SPROGELL, OF SAME PLACE.

IMPROVEMENT IN PROCESSES FOR UTILIZING TIN-SCRAP.

Specification forming part of Letters Patent No. 171,276, dated December 21, 1875; application filed July 24, 1875.

*To all whom it may concern:*

Be it known that I, HERMAN FRASCH, of the city and county of Philadelphia, and State of Pennsylvania, have invented a new and useful Improvement in Utilizing Tin-Scrap; and I do hereby declare the following to be a clear and exact description of the nature thereof, sufficient to enable others skilled in the art to which my invention appertains to fully understand, make, and use the same.

My invention consists in hydrothionous acid for detinning tin scrap or clippings.

In carrying out my invention, I take hydrothionous acid and dip therein the tin scrap or clippings until the tin is dissolved from the iron, the tin being kept in motion during the process of dissolving. When the tin is entirely dissolved the iron is left with a light coat of sulphureted iron, which requires to be removed, in order to make the iron pure. This is accomplished by placing the iron in a lime solution, kept hot. The hydrothionous acid, after being perfectly saturated with tin, is evaporated by a steam-coil, or other proper appliance, and the residue is roasted in a suitable furnace, whereby there is produced oxide of tin, and this oxide of tin is then mixed with coal in a furnace, so as to reduce it to metallic tin.

Hydrothionous acid (formula $S_5H_2$) is obtained by melting salt cake (bisulphate of soda) with coal, and saturating the formed sulphureted sodium with hydrochloric acid, (salt being a side product,) or by saturating a solution of sulphureted calcium with hydrochloric acid, added without stirring. Hydrothionous acid, the result, is a heavy oil-like liquid, heavier than water. Any sulphureted alkali or metal may be employed for the preparation of the acid.

I am aware that tin has heretofore been removed from tin-scrap by the use of calcium sulphide; but this I do not claim.

Having thus described my invention, what I claim as new, and desire to secure by Letters Patent, is—

The within-described process of utilizing tin-scrap, which process consists in, first, treating the scrap with hydrothionous acid, (or hydrogen disulphide,) evaporating the thus-formed tin solution to dryness, and, finally, reducing the tin by means of carbon, substantially as described.

HERMAN FRASCH.

Witnesses:
JOHN A. WIEDERSHEIM,
ALBERT H. HOECKLEY.